US009819537B2

(12) United States Patent
Palin et al.

(10) Patent No.: US 9,819,537 B2
(45) Date of Patent: *Nov. 14, 2017

(54) SYSTEMS, METHODS, AND APPARATUSES FOR PROVIDING ADAPTIVE USER NOTIFICATIONS

(71) Applicant: Nokia Technologies OY, Espoo (FI)

(72) Inventors: Arto Palin, Viiala (FI); Juha Salokannel, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 14/829,069

(22) Filed: Aug. 18, 2015

(65) Prior Publication Data

US 2015/0358197 A1 Dec. 10, 2015

Related U.S. Application Data

(63) Continuation of application No. 12/826,034, filed on Jun. 29, 2010.

(51) Int. Cl.
G08B 21/00 (2006.01)
H04L 12/24 (2006.01)
H04L 29/08 (2006.01)
H04L 12/26 (2006.01)
H04M 19/04 (2006.01)

(52) U.S. Cl.
CPC .......... H04L 41/0686 (2013.01); H04L 43/04 (2013.01); H04L 67/22 (2013.01); H04M 19/04 (2013.01)

(58) Field of Classification Search
CPC ......... H04L 43/04; H04L 67/22; H04M 19/04
USPC ........................................................ 340/540
See application file for complete search history.

(56) References Cited

U.S. PATENT DOCUMENTS 6,021,432 A 2/2000 Sizer, II et al.
6,049,718 A 4/2000 Stewart
6,181,781 B1 1/2001 Porter et al.
(Continued)

FOREIGN PATENT DOCUMENTS

CN 101355638 A 1/2009
GB 2 463 105 A 3/2010

OTHER PUBLICATIONS

International Search Report for corresponding International Application No. PCT/FI2011/050561, dated Sep. 20, 2011.
(Continued)

Primary Examiner — Kerri McNally
(74) Attorney, Agent, or Firm — Alston & Bird LLP

(57) ABSTRACT

Methods and apparatuses are provided for providing adaptive user notifications. A method may include detecting an event. The method may further include determining usage of one or more connected apparatuses. The method may also include determining, based on the determined usage, a notification method for notifying of the event. The method may additionally include generating an event notification message based on the determined notification method. The method may further include causing the event notification message to be sent to a connected apparatus to trigger the connected apparatus to provide an alert indicative of the event in accordance with the determined notification method. Corresponding apparatuses are also provided.

18 Claims, 7 Drawing Sheets

(56) References Cited

U.S. PATENT DOCUMENTS

| | | |
|---|---|---|
| 6,255,937 B1 | 7/2001 | Hamaguchi |
| 6,459,913 B2 | 10/2002 | Cloutier |
| 6,631,363 B1 | 10/2003 | Brown et al. |
| 7,133,700 B2 | 11/2006 | Benco et al. |
| 7,418,714 B2 | 8/2008 | Hills et al. |
| 7,685,292 B1 | 3/2010 | Kinsella et al. |
| 7,756,539 B2 | 7/2010 | Milstein et al. |
| 8,130,639 B1 | 3/2012 | Robbins |
| 8,644,807 B2 | 2/2014 | Wisebourt et al. |
| 2002/0105539 A1 | 8/2002 | Gamzon et al. |
| 2003/0163599 A1 | 8/2003 | Hills et al. |
| 2003/0200192 A1 | 10/2003 | Bell et al. |
| 2004/0187104 A1 | 9/2004 | Sardesai et al. |
| 2004/0201470 A1 | 10/2004 | Reed |
| 2005/0233774 A1 | 10/2005 | Ladouceur et al. |
| 2005/0272408 A1 | 12/2005 | Wilkes-Gibbs et al. |
| 2006/0023642 A1 | 2/2006 | Roskowski et al. |
| 2006/0112104 A1 | 5/2006 | An et al. |
| 2006/0270430 A1 | 11/2006 | Milstein et al. |
| 2006/0271695 A1 | 11/2006 | Lavian |
| 2007/0042710 A1 | 2/2007 | Mahini et al. |
| 2007/0082659 A1 | 4/2007 | Nevalainen |
| 2007/0115108 A1 | 5/2007 | Martin et al. |
| 2007/0167186 A1 | 7/2007 | Boss et al. |
| 2007/0226175 A1 | 9/2007 | Resnic et al. |
| 2007/0273517 A1 | 11/2007 | Govind |
| 2007/0281762 A1* | 12/2007 | Barros ............... H04M 1/6066 455/575.6 |
| 2007/0285258 A1 | 12/2007 | Hartman |
| 2008/0010602 A1 | 1/2008 | Redpath |
| 2008/0063154 A1 | 3/2008 | Tamari et al. |
| 2008/0120205 A1 | 5/2008 | Hoopes et al. |
| 2008/0120688 A1 | 5/2008 | Qiu et al. |
| 2008/0143517 A1 | 6/2008 | Goffin |
| 2009/0031340 A1 | 1/2009 | Modi et al. |
| 2009/0091448 A1 | 4/2009 | Leyden et al. |
| 2009/0160643 A1 | 6/2009 | Lizza |
| 2009/0253454 A1 | 10/2009 | Sampson |
| 2010/0093271 A1 | 4/2010 | Nowlan et al. |
| 2010/0115040 A1 | 5/2010 | Sargent et al. |
| 2010/0180001 A1 | 7/2010 | Hardt |
| 2010/0188245 A1 | 7/2010 | Nielsen et al. |
| 2010/0189887 A1 | 7/2010 | Nielsen et al. |
| 2010/0223376 A1 | 9/2010 | Park et al. |
| 2010/0245086 A1 | 9/2010 | Nielsen et al. |
| 2010/0253513 A1 | 10/2010 | Nielsen et al. |
| 2010/0253514 A1 | 10/2010 | Nielsen et al. |
| 2010/0256825 A1 | 10/2010 | Nielsen et al. |
| 2010/0257029 A1 | 10/2010 | Nielsen et al. |
| 2010/0262470 A1 | 10/2010 | Nielsen et al. |
| 2011/0003587 A1* | 1/2011 | Belz ..................... H04M 19/04 455/419 |
| 2011/0112819 A1 | 5/2011 | Shirai et al. |
| 2011/0169632 A1* | 7/2011 | Walker ..................... H03G 3/32 340/539.13 |
| 2011/0304550 A1 | 12/2011 | Romera Jolliff et al. |

OTHER PUBLICATIONS

Office Action for Chinese Application No. 2011800404175 dated Jan. 4, 2015.

Office Action for Russian Application No. 2013103430 dated Jan. 19, 2015.

Written Opinion from corresponding International Application No. PCT/FI2011/050561 dated Sep. 20, 2011.

Office Action for Chinese Application No. 2011800404175 dated Sep. 17, 2015.

Office Action for U.S. Appl. No. 12/826,034, dated Jul. 24, 2012, 35 pages.

Final Office Action for U.S. Appl. No. 12/826,034, dated Feb. 15, 2013, 35 pages.

Office Action for U.S. Appl. No. 12/826,034, dated Oct. 29, 2014, 37 pages.

Final Office Action for U.S. Appl. No. 12/826,034, dated Mar. 25, 2015, 40 pages.

Extended European Search Report for European Patent Application No. 11800240.1 dated Feb. 1, 2017, 7 pages.

Notice of Allowance for U.S. Appl. No. 12/826,034, dated Apr. 26, 2017.

\* cited by examiner

SYSTEMS, METHODS, AND APPARATUSES FOR PROVIDING ADAPTIVE USER NOTIFICATIONS

CROSS REFERENCE TO RELATED APPLICATIONS

This non-provisional application is a continuation of U.S. application Ser. No. 12/826,034, filed Jun. 29, 2010, the entire contents of which are hereby incorporated by reference.

TECHNOLOGICAL FIELD

Embodiments of the present invention relate generally to communication technology and, more particularly, relate to systems, methods, and apparatuses for providing adaptive user notifications.

BACKGROUND

The modern communications era has brought about a tremendous expansion of wireline and wireless networks. Wireless and mobile networking technologies have addressed related consumer demands, while providing more flexibility and immediacy of information transfer. Concurrent with the expansion of networking technologies, an expansion in computing power has resulted in development of affordable computing devices capable of taking advantage of services made possible by modern networking technologies. This expansion in computing power has led to a reduction in the size of computing devices and given rise to a new generation of mobile devices that are capable of performing functionality that only a few years ago required processing power that could be provided only by the most advanced desktop computers. Consequently, mobile computing devices having a small form factor have become ubiquitous and are used to access network applications and services by consumers of all socioeconomic backgrounds.

Many mobile computing devices are now configured to interface with other mobile computing devices, such as user interface devices, using various interfacing techniques. One such interfacing technique is use of Bluetooth® to facilitate exchange of information between mobile devices, such as between a mobile phone and a headset. Accordingly, many users frequently use a plurality of interfaced mobile computing devices to enhance their mobile computing experience.

BRIEF SUMMARY

Systems, methods, apparatuses, and computer program products described herein provide adaptive user notification. The systems, methods, apparatuses, and computer program products provided in accordance with example embodiments of the invention may provide several advantages to computing devices and computing device users. In this regard, some example embodiments provide for adaptive notification of events, such as communications events. For example, some example embodiments provide a communication apparatus configured to determine usage of one or more apparatuses connected to the communication apparatus and to determine based on the determined usage a notification method for notifying of an event. Such example embodiments may accordingly adapt notification of an event based on the user's usage of connected apparatuses as well as the available user interface capabilities of those connected apparatuses. Some example embodiments may advantageously determine a notification method enabling notification of an event without interfering with usage of a connected apparatus. For example, some example embodiments may be configured to determine whether audio is being streamed to a connected headset and, in the event audio is being streamed to the connected headset, determine an alternative non-audible notification method via another connected apparatus to enable alerting the user of an event without interfering with streaming audio to the headset.

In a first example embodiment, a method is provided, which comprises detecting an event. The method of this example embodiment further comprises determining usage of one or more connected apparatuses. The method of this example embodiment additionally comprises determining, based on the determined usage, a notification method for notifying of the event. The method of this example embodiment also comprises generating an event notification message based on the determined notification method. The method of this example embodiment further comprises causing the event notification message to be sent to a connected apparatus to trigger the connected apparatus to provide an alert indicative of the event in accordance with the determined notification method.

In another example embodiment, an apparatus is provided. The apparatus of this example embodiment comprises at least one processor and at least one memory storing computer program code, wherein the at least one memory and stored computer program code are configured, with the at least one processor, to cause the apparatus to at least detect an event. The at least one memory and stored computer program code are configured, with the at least one processor, to further cause the apparatus of this example embodiment to determine usage of one or more connected apparatuses. The at least one memory and stored computer program code are configured, with the at least one processor, to additionally cause the apparatus of this example embodiment to determine, based on the determined usage, a notification method for notifying of the event. The at least one memory and stored computer program code are configured, with the at least one processor, to also cause the apparatus of this example embodiment to generate an event notification message based on the determined notification method. The at least one memory and stored computer program code are configured, with the at least one processor, to further cause the apparatus of this example embodiment to cause the event notification message to be sent to a connected apparatus to trigger the connected apparatus to provide an alert indicative of the event in accordance with the determined notification method.

In another example embodiment, a computer program product is provided. The computer program product of this example embodiment includes at least one computer-readable storage medium having computer-readable program instructions stored therein. The program instructions of this example embodiment comprise program instructions configured to detect an event. The program instructions of this example embodiment further comprise program instructions configured to determine usage of one or more connected apparatuses. The program instructions of this example embodiment additionally comprise program instructions configured to determine based on the determined usage, a notification method for notifying of the event. The program instructions of this example embodiment also comprise program instructions configured to generate an event notification message based on the determined notification method. The program instructions of this example embodiment further comprise program instructions configured to cause the event notification message to be sent to a connected apparatus to trigger the connected apparatus to provide an alert indicative of the event in accordance with the determined notification method.

In another example embodiment, an apparatus is provided that comprises means for detecting an event. The apparatus of this example embodiment further comprises means for determining usage of one or more connected apparatuses. The apparatus of this example embodiment additionally comprises means for determining, based on the determined usage, a notification method for notifying of the event. The apparatus of this example embodiment also comprises means for generating an event notification message based on the determined notification method. The apparatus of this example embodiment further comprises means for causing the event notification message to be sent to a connected apparatus to trigger the connected apparatus to provide an alert indicative of the event in accordance with the determined notification method.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWING(S)

Having thus described embodiments of the invention in general terms, reference will now be made to the accompanying drawings, which are not necessarily drawn to scale, and wherein:

DETAILED DESCRIPTION

Figure 1:
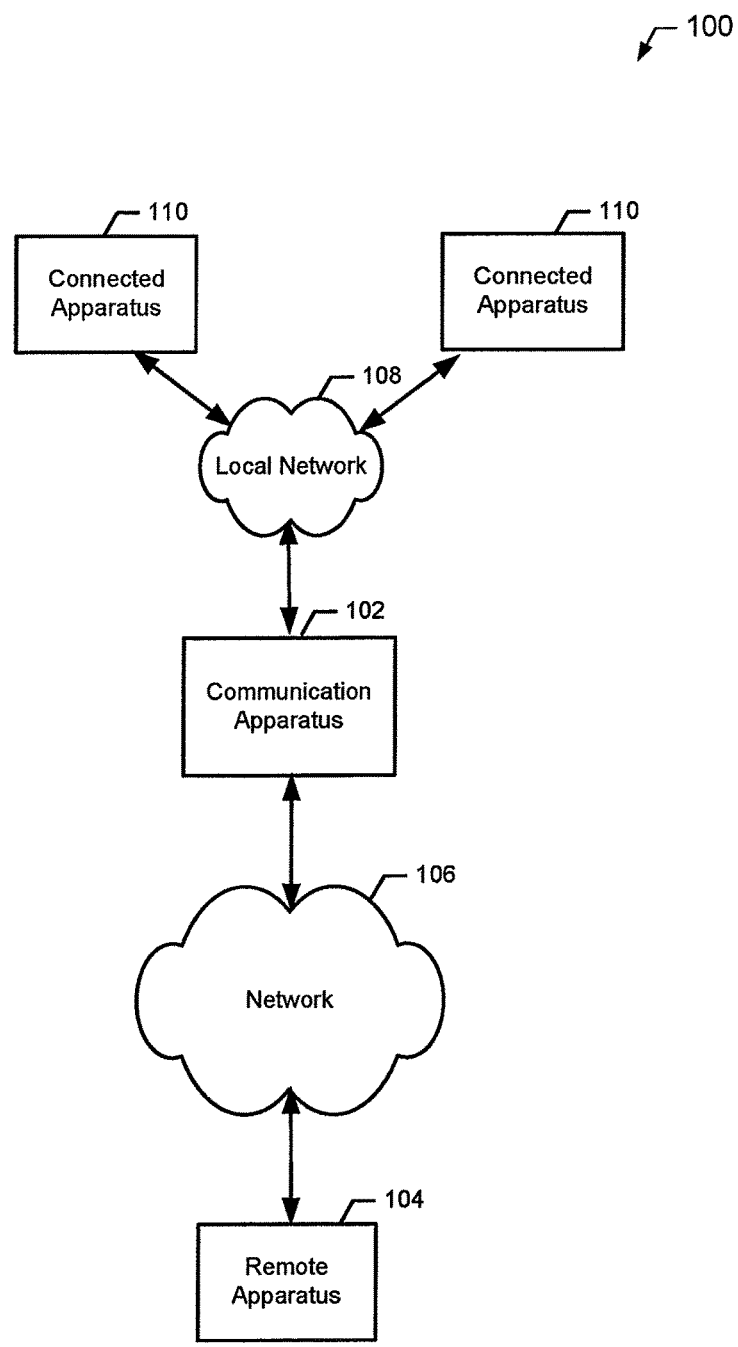
FIG. 1 illustrates a block diagram of a system for providing adaptive user notifications according to an example embodiment of the invention.

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like.

Additionally, as used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

FIG. 1 illustrates a block diagram of a system 100 for providing adaptive user notifications according to an example embodiment of the invention. It will be appreciated that the system 100 as well as the illustrations in other figures are each provided as an example of one embodiment of the invention and should not be construed to narrow the scope or spirit of the invention in any way. In this regard, the scope of the disclosure encompasses many potential embodiments in addition to those illustrated and described herein. As such, while FIG. 1 illustrates one example of a configuration of a system for providing adaptive user notifications, numerous other configurations may also be used to implement embodiments of the present invention.

In at least some embodiments, the system 100 includes a communication apparatus 102 and one or more remote apparatuses 104, which may be in communication over a network 106. The network 106 may comprise a wireless network (for example, a cellular network, wireless local area network, wireless personal area network, wireless metropolitan area network, and/or the like), a wireline network, or some combination thereof, and in some embodiments comprises at least a portion of the internet. In this regard, the network 106 may comprise any network configured for facilitating communication between the communication apparatus 102 and a remote apparatus 104.

The communication apparatus 102 may be embodied as any computing device, such as, a desktop computer, laptop computer, mobile terminal, mobile computer, mobile phone, mobile communication device, game device, digital camera/camcorder, audio/video player, television device, radio receiver, digital video recorder, positioning device, wrist watch, portable digital assistant (PDA), any combination thereof, and/or the like. In this regard, the communication apparatus 102 may comprise any computing device configured to receive a communication, such as, an email, phone call, text message, short message service (SMS) message, multimedia message, multimedia messaging service (MMS) message, instant message, and/or the like, sent to the communication apparatus by a remote apparatus 104.

A remote apparatus 104 may likewise be embodied as any computing device, such as, a desktop computer, laptop computer, mobile terminal, mobile computer, mobile phone, mobile communication device, game device, digital camera/camcorder, audio/video player, television device, radio receiver, digital video recorder, positioning device, wrist watch, portable digital assistant (PDA), one or more network nodes, one or more servers, any combination thereof, and/or the like. Accordingly, it will be appreciated that the remote apparatus 104 may comprise any entity configured to send, forward, and/or route a communication to the communication apparatus 102 over the network 106.

As illustrated in FIG. 1, the communication apparatus 102 may also be connected to one or more connected apparatuses 110 in the system 100 by way of a local network 108. Although two such connected apparatuses 110 are illustrated in FIG. 1, it will be appreciated that this illustration is by way of example and there may be any number of such connected apparatuses 110 in the system 100. The local network 108 may, for example, comprise a personal area network, local area network, some combination thereof, or the like. The local network 108 may comprise a structured network or may comprise an ad hoc network formed by the communication apparatus 102 and one or more connected apparatuses 110. In some example embodiments, the local network 108 comprises a wireless network, which may operate in accordance with BlueTooth or other Institute of Electrical and Electronics Engineers (IEEE) 802.15 protocol, an IEEE 802.11 protocol, some other radio frequency networking standard, some combination thereof, or the like. As another example, the local network 108 may comprise a wireline network formed at least in part by wired connection(s) between the communication apparatus 102 and one or more connected apparatuses 110. Accordingly, it will be appreciated that the local network 108 may comprise any appropriate network facilitating local data exchange between the communication apparatus 102 and one or more connected apparatuses 110.

Figure 2:
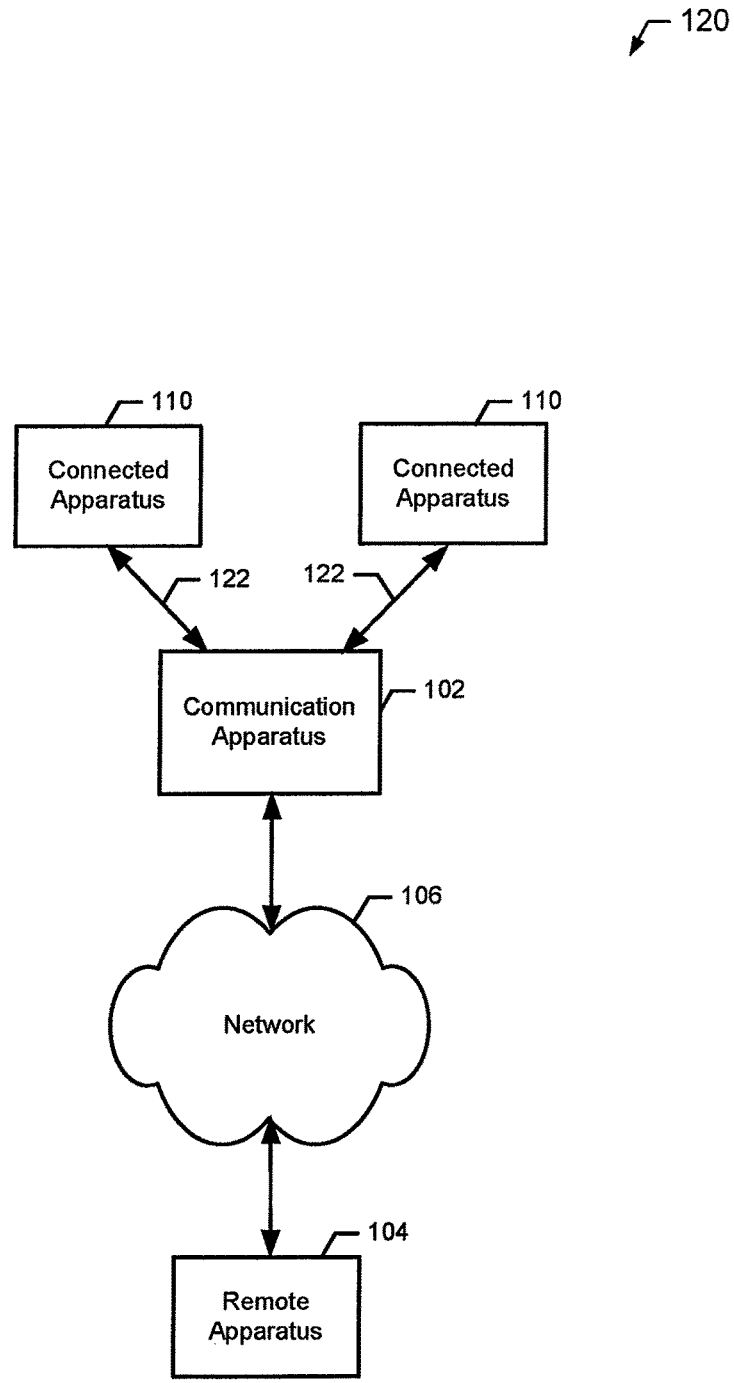
FIG. 2 illustrates a block diagram of a system for providing adaptive user notifications according to an example embodiment of the invention.

A connected apparatus 110 may comprise any computing device configured to connect to the communication apparatus 102, such as by way of the local network 108, a communication link 122 as described with respect to FIG. 2, and/or the like. In this regard, the connected apparatus 110 may be configured to receive data from and/or send data to a connected communication apparatus 102. Such data may include, but is not limited to, messages, audio data, video data, commands, and/or the like. A connected apparatus 110 may be embodied as any computing device, such as, a desktop computer, laptop computer, mobile terminal, mobile computer, mobile phone, mobile communication device, game device, digital camera/camcorder, audio/video player, television device, radio receiver, digital video recorder, positioning device, wrist watch, wrist worn device, headset, portable digital assistant (PDA), any combination thereof, and/or the like. In one example embodiment, a connected apparatus 110 may comprise a headset, such as may be configured to receive audio streamed by the communication apparatus 102. In another example embodiment, a connected apparatus 110 may comprise a wrist watch. In yet another example embodiment, a connected apparatus 110 may comprise a tablet computing device or other computing device configured to be tethered to the communication apparatus 102 for purposes of utilizing a network connection to the network 106 or other network that may be provided by some example embodiments of the communication apparatus 102.

Referring now to FIG. 2, FIG. 2 illustrates block diagram of a system 120 for providing adaptive user notifications according to another example embodiment of the invention. The system 120 may comprise a communication apparatus 102 and remote apparatus 104 configured to communicate over a network 106, as described with respect to the system 100 illustrated in FIG. 1. The system 120 may also comprise one or more connected apparatuses 110 connected to the communication apparatus 102. However, rather than being connected to the communication apparatus 102 via a local network as described with respect to the system 100, a connected apparatus 110 may be connected to the communication apparatus 102 via a direct communication link 122.

A communication link 122 may, for example, comprise a wired connection. The wired connection may comprise a universal serial bus (USB) connection, IEEE 1394 (Firewire) connection, serial connection, parallel connection, or the like. Alternatively, a communication link 122 may comprise a direct wireless connection between the communication apparatus 102 and a connected apparatus 110. The wireless connection may comprise a connection via any electromagnetic means for interfacing two computing devices. For example, the electromagnetic means may comprise a Bluetooth or other IEE 802.15 standard communication link, a ZigBee communication link, an Ultra-Wideband communication link, a wireless USB communication link, other radio frequency communication link, an infrared communication link, or the like.

Although illustrated in FIGS. 1 and 2 as discrete systems, it will be appreciated that a communication apparatus 102 in accordance with some example embodiments may be connected to a plurality of connected apparatuses 110 by a combination of a local network 102 and one or more communication links 122. In this regard, the communication apparatus 102 may be concurrently connected to one or more connected apparatuses 110 by way of a local network 108 and to one or more connected apparatuses 110 by way of one or more communication links 122.

Figure 3:
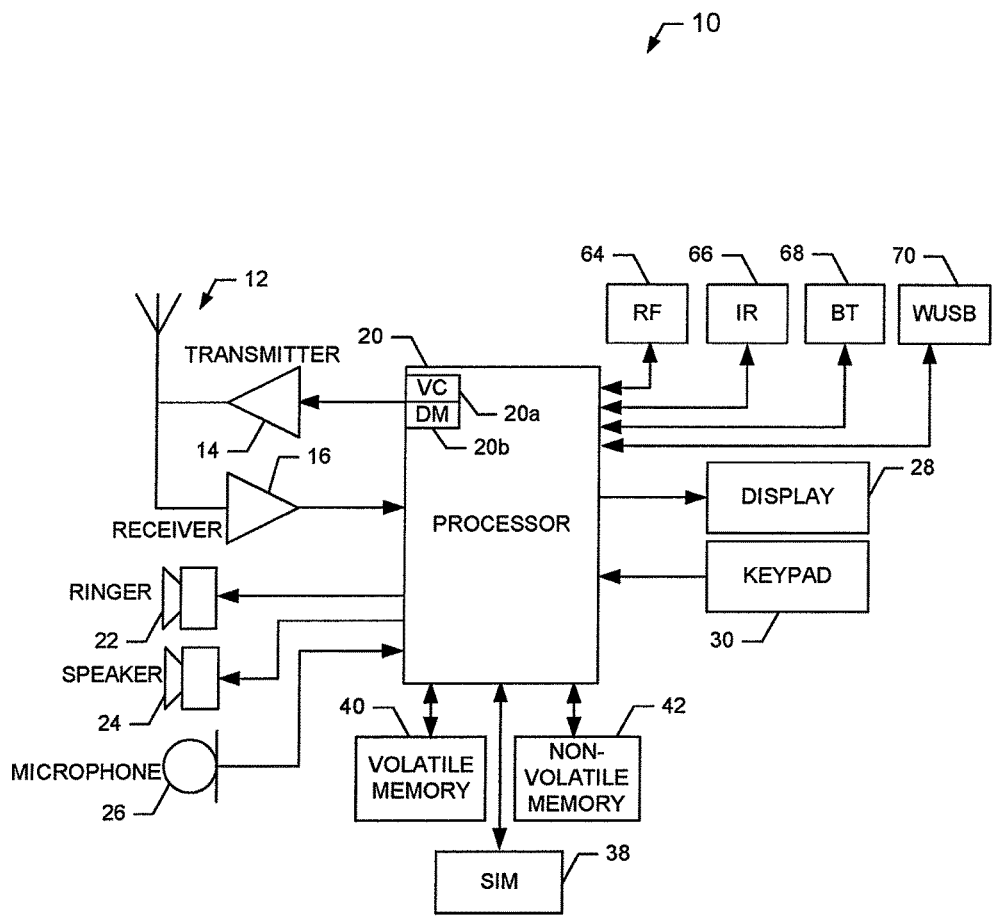
FIG. 3 is a schematic block diagram of a mobile terminal according to an example embodiment of the invention.

In an example embodiment, the communication apparatus 102 is embodied as a mobile terminal, such as that illustrated in FIG. 3. In this regard, FIG. 3 illustrates a block diagram of a mobile terminal 10 representative of one example embodiment of a communication apparatus 102. It should be understood, however, that the mobile terminal 10 illustrated and hereinafter described is merely illustrative of one type of communication apparatus 102 that may implement and/or benefit from embodiments of the present invention and, therefore, should not be taken to limit the scope of the present invention. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ embodiments of the present invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 3 as a single processor, in some embodiments the processor 20 comprises a plurality of processors. These signals sent and received by the processor 20 may include signaling information in accordance with an air interface standard of an applicable cellular system, and/or any number of different wireline or wireless networking techniques, comprising but not limited to Wireless-Fidelity (Wi-Fi), wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (for example, session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (for example, digital/analog or TDMA/CDMA/analog phones). Additionally, the mobile terminal 10 may be capable of operating according to Wireless Fidelity (Wi-Fi) or Worldwide Interoperability for Microwave Access (Wi-MAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (for example, software and/or firmware) stored on a memory accessible to the processor 20 (for example, volatile memory 40, non-volatile memory 42, and/or the like). Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

As shown in FIG. 3, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to Bluetooth Low Energy radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including Wireless Fidelity (Wi-Fi), WLAN techniques such as IEEE 802.11 techniques, IEEE 802.15 techniques, IEEE 802.16 techniques, and/or the like.

The mobile terminal 10 may comprise memory, such as a subscriber identity module (SIM) 38, a universal subscriber identity module (USIM), a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (for example, hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Figure 4:
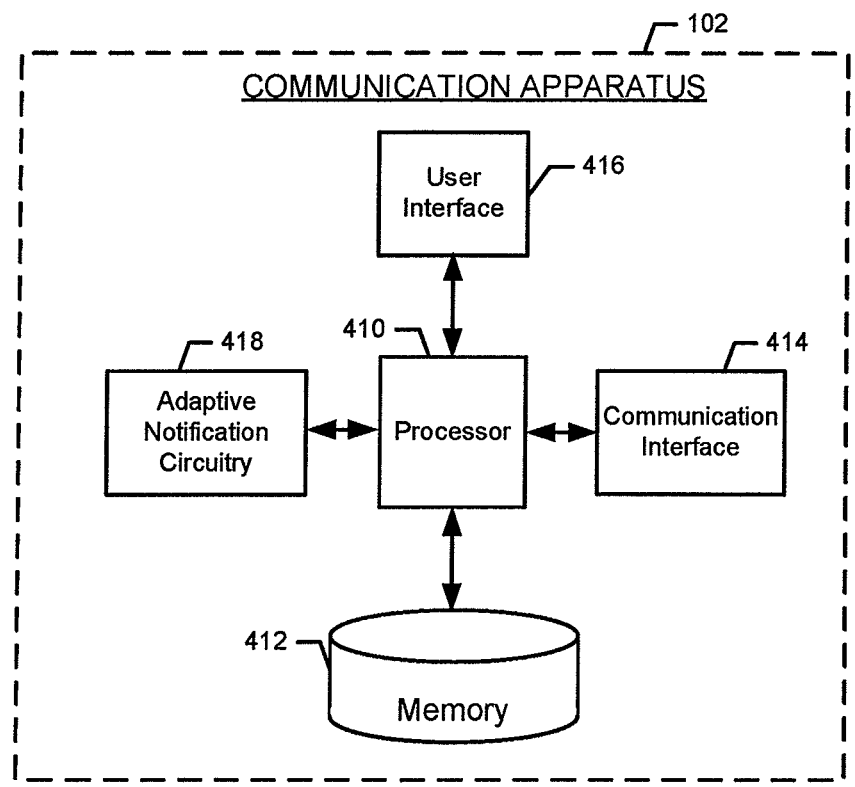
FIG. 4 illustrates a block diagram of a communication apparatus for providing adaptive user notifications according to an example embodiment of the invention.

Referring now to FIG. 4, FIG. 4 illustrates a block diagram of a communication apparatus 102 for providing adaptive user notifications according to an example embodiment of the invention. In the example embodiment illustrated in FIG. 4, the communication apparatus 102 may include various means, such as one or more of a processor 410, memory 412, communication interface 414, user interface 416, and adaptive notification circuitry 418 for performing the various functions herein described. These means of the communication apparatus 102 as described herein may be embodied as, for example, circuitry, hardware elements (for example, a suitably programmed processor, combinational logic circuit, and/or the like), a computer program product comprising computer-readable program instructions (for example, software or firmware) stored on a computer-readable medium (for example, memory 412) that is executable by a suitably configured processing device (for example, the processor 410), or some combination thereof.

The processor 410 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 4 as a single processor, in some embodiments the processor 410 comprises a plurality of processors. The plurality of processors may be in operative communication with each other and may be collectively configured to perform one or more functionalities of the communication apparatus 102 as described herein. In embodiments wherein the communication apparatus 102 is embodied as a mobile terminal 10, the processor 410 may be embodied as or comprise the processor 20. In an example embodiment, the processor 410 is configured to execute instructions stored in the memory 412 or otherwise accessible to the processor 410. These instructions, when executed by the processor 410, may cause the communication apparatus 102 to perform one or more of the functionalities of the communication apparatus 102 as described herein. As such, whether configured by hardware or software methods, or by a combination thereof, the processor 410 may comprise an entity capable of performing operations according to various embodiments while configured accordingly. Thus, for example, when the processor 410 is embodied as an ASIC, FPGA or the like, the processor 410 may comprise specifically configured hardware for conducting one or more operations described herein. Alternatively, as another example, when the processor 410 is embodied as an executor of instructions, such as may be stored in the memory 412, the instructions may specifically configure the processor 410 to perform one or more algorithms and operations described herein.

The memory 412 may comprise, for example, volatile memory, non-volatile memory, or some combination thereof. Although illustrated in FIG. 4 as a single memory, the memory 412 may comprise a plurality of memories. In various embodiments, the memory 412 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the communication apparatus 102 is embodied as a mobile terminal 10, the memory 412 may comprise the volatile memory 40 and/or the non-volatile memory 42. The memory 412 may be configured to store information, data, applications, instructions, or the like for enabling the communication apparatus 102 to carry out various functions in accordance with various example embodiments. For example, in at least some embodiments, the memory 412 is configured to buffer input data for processing by the processor 410. Additionally or alternatively, in at least some embodiments, the memory 412 is configured to store program instructions for execution by the processor 410. The memory 412 may store information in the form of static and/or dynamic information. This stored information may be stored and/or used by the adaptive notification circuitry 418 during the course of performing its functionalities.

The communication interface 414 may be embodied as any device or means embodied in circuitry, hardware, a computer program product comprising computer readable program instructions stored on a computer readable medium (for example, the memory 412) and executed by a processing device (for example, the processor 410), or a combination thereof that is configured to receive and/or transmit data from/to an entity of the system 100 and/or the system 120 by way of the network 106, local network 108, communication link 122, and/or the like. In at least one embodiment, the communication interface 414 is at least partially embodied as or otherwise controlled by the processor 410. The communication interface 414 may, for example, be in communication with the processor 410, such as via a bus. The communication interface 414 may include, for example, an antenna, a transmitter, a receiver, a transceiver and/or supporting hardware or software for enabling communications with one or more entities of the system 100 and/or the system 122. The communication interface 414 may be configured to receive and/or transmit data using any protocol that may be used for communications between entities of the system 100 and/or the system 122. In this regard, the communication interface 414 may be configured to receive and/or transmit data using any protocol supported by the network 106, local network 108, and/or by a communication link 122. The communication interface 414 may additionally be in communication with the memory 412, user interface 416, and/or adaptive notification circuitry 418, such as via a bus.

The user interface 416 may be in communication with the processor 410 to receive an indication of a user input and/or to provide an audible, visual, mechanical, or other output to a user. As such, the user interface 416 may include, for example, a keyboard, a mouse, a joystick, a display, a touch screen display, a microphone, a speaker, and/or other input/output mechanisms. The user interface 416 additionally may be in communication with the memory 412, communication interface 414, and/or adaptive notification circuitry 418, such as via a bus.

The adaptive notification circuitry 418 may be embodied as various means, such as circuitry, hardware, a computer program product comprising computer readable program instructions stored on a computer readable medium (for example, the memory 412) and executed by a processing device (for example, the processor 410), or some combination thereof and, in one embodiment, is embodied as or otherwise controlled by the processor 410. In embodiments wherein the adaptive notification circuitry 418 is embodied separately from the processor 410, the adaptive notification circuitry 418 may be in communication with the processor 410. The adaptive notification circuitry 418 may further be in communication with one or more of the memory 412, communication interface 414, or user interface 416, such as via a bus.

Figure 5:
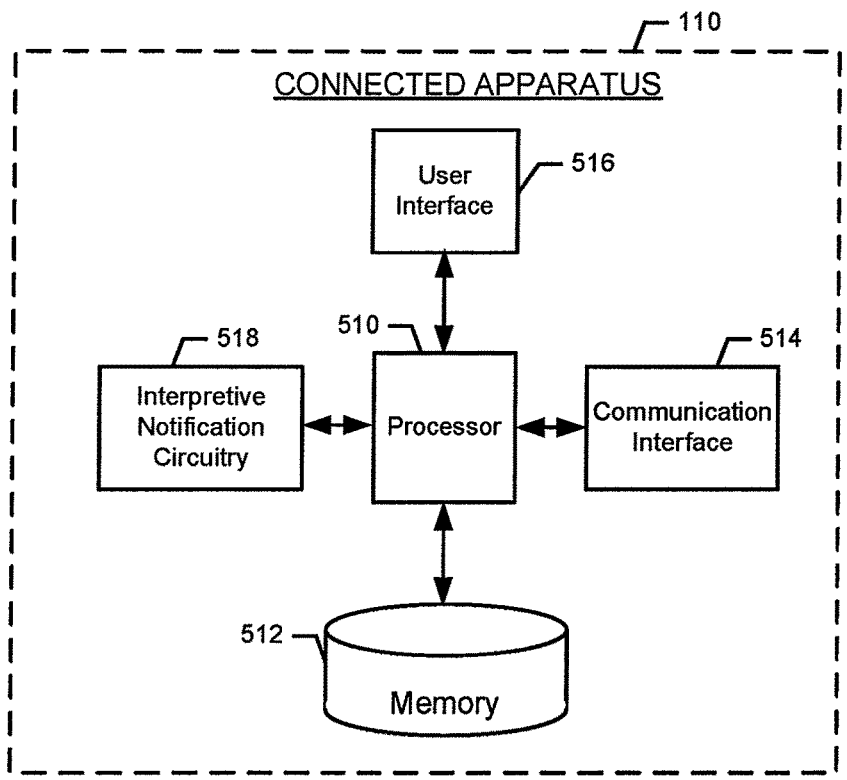
FIG. 5 illustrates a block diagram of a connected apparatus for providing adaptive user notifications according to an example embodiment of the invention.

Referring now to FIG. 5, FIG. 5 illustrates a block diagram of a connected apparatus 110 for providing adaptive user notifications according to an example embodiment of the invention. In the example embodiment illustrated in FIG. 5, the connected apparatus 110 may include various means, such as one or more of a processor 510, memory 512, communication interface 514, user interface 516, and interpretive notification circuitry 518 for performing the various functions herein described. These means of the connected apparatus 110 as described herein may be embodied as, for example, circuitry, hardware elements (for example, a suitably programmed processor, combinational logic circuit, and/or the like), a computer program product comprising computer-readable program instructions (for example, software or firmware) stored on a computer-readable medium (for example, memory 512) that is executable by a suitably configured processing device (for example, the processor 510), or some combination thereof.

The processor 510 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 5 as a single processor, in some embodiments the processor 510 comprises a plurality of processors. The plurality of processors may be in operative communication with each other and may be collectively configured to perform one or more functionalities of the connected apparatus 110 as described herein. In an example embodiment, the processor 510 is configured to execute instructions stored in the memory 512 or otherwise accessible to the processor 510. These instructions, when executed by the processor 510, may cause the connected apparatus 110 to perform one or more of the functionalities of the connected apparatus 110 as described herein. As such, whether configured by hardware or software methods, or by a combination thereof, the processor 510 may comprise an entity capable of performing operations according to various embodiments while configured accordingly. Thus, for example, when the processor 510 is embodied as an ASIC, FPGA or the like, the processor 510 may comprise specifically configured hardware for conducting one or more operations described herein. Alternatively, as another example, when the processor 510 is embodied as an executor of instructions, such as may be stored in the memory 512, the instructions may specifically configure the processor 510 to perform one or more algorithms and operations described herein.

The memory 512 may comprise, for example, volatile memory, non-volatile memory, or some combination thereof. Although illustrated in FIG. 5 as a single memory, the memory 512 may comprise a plurality of memories. In various embodiments, the memory 512 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. The memory 512 may be configured to store information, data, applications, instructions, or the like for enabling the connected apparatus 110 to carry out various functions in accordance with various example embodiments. For example, in at least some embodiments, the memory 512 is configured to buffer input data for processing by the processor 510. Additionally or alternatively, in at least some embodiments, the memory 512 is configured to store program instructions for execution by the processor 510. The memory 512 may store information in the form of static and/or dynamic information. This stored information may be stored and/or used by the interpretive notification circuitry 518 during the course of performing its functionalities.

The communication interface 514 may be embodied as any device or means embodied in circuitry, hardware, a computer program product comprising computer readable program instructions stored on a computer readable medium (for example, the memory 512) and executed by a processing device (for example, the processor 510), or a combination thereof that is configured to receive and/or transmit data from/to the communication apparatus 102 and/or another connected apparatus 110 by way of the local network 108, a communication link 122, and/or the like. In at least one embodiment, the communication interface 514 is at least partially embodied as or otherwise controlled by the processor 510. The communication interface 514 may, for example, be in communication with the processor 510, such as via a bus. The communication interface 514 may include, for example, an antenna, a transmitter, a receiver, a transceiver and/or supporting hardware or software for enabling communications with the communication apparatus 102 and/or other entity of the system 100 and/or system 120. The communication interface 514 may be configured to receive and/or transmit data using any protocol that may be used for communications between entities of the system 100 and/or the system 122. In this regard, the communication interface 514 may be configured to receive and/or transmit data using any protocol supported by local network 108 and/or by a communication link 122. The communication interface 514 may additionally be in communication with the memory 512, user interface 516, and/or interpretive notification circuitry 518, such as via a bus.

The user interface 516 may be in communication with the processor 510 to receive an indication of a user input and/or to provide an audible, visual, mechanical, or other output to a user. As such, the user interface 516 may include, for example, a keyboard, a mouse, a joystick, a display, a touch screen display, a microphone, a speaker, and/or other input/ output mechanisms. The user interface 516 additionally may be in communication with the memory 512, communication interface 514, and/or interpretive notification circuitry 518, such as via a bus.

The interpretive notification circuitry 518 may be embodied as various means, such as circuitry, hardware, a computer program product comprising computer readable program instructions stored on a computer readable medium (for example, the memory 512) and executed by a processing device (for example, the processor 510), or some combination thereof and, in one embodiment, is embodied as or otherwise controlled by the processor 510. In embodiments wherein the interpretive notification circuitry 518 is embodied separately from the processor 510, the interpretive notification circuitry 518 may be in communication with the processor 510. The interpretive notification circuitry 518 may further be in communication with one or more of the memory 512, communication interface 514, or user interface 516, such as via a bus.

In some example embodiments, the adaptive notification circuitry 418 is configured to detect an event. The detected event may, for example, comprise a communication event. In this regard, a communication event may, for example, comprise receipt/sending of a communication. For example, a communication event may comprise receipt of a communication sent to the communication apparatus 102 over the network 106, such as by a remote apparatus 104. Such communication may, for example, comprise a phone call, email, instant message, short message service message, text message, multimedia messaging service message, multimedia message, a web feed (e.g., a Really Simple Syndication feed), or the like. It will be appreciated, however, that the adaptive notification circuitry 418 may, in some example embodiments, be configured to detect other types of events in addition to or in alternative to communication events. For example, the adaptive notification circuitry 418 may be configured to detect that a power source powering the communication apparatus 102 has less than a predefined amount of power remaining (e.g., a low battery condition). As another example, a detected event may comprise a browsing event, such as may be related to browsing by a user of the communication apparatus 102. For example, a browsing event may comprise a page load event indicating that a page has been loaded. As yet a further example, a detected event may be related to a calendar appointment, meeting, or the like, such as may be entered into a calendar or scheduling application. In this regard, a detected event may comprise a start time of a scheduled appointment, meeting, or the like.

The adaptive notification circuitry 418 may be further configured to determine usage of one or more connected apparatuses 110 connected to the communication apparatus 102. In this regard, the adaptive notification circuitry 418 may be configured to determine what connected apparatus(es) 110 are connected to the communication apparatus 102, what capabilities the connected apparatus(es) 110 have, how the connected apparatus(es) 110 are being used, and/or the like. For example, the adaptive notification circuitry 418 may be configured to determine that audio is being streamed to a connected headset. As another example, the adaptive notification circuitry 418 may be configured to determine that a connected apparatus 110 is tethered to the communication apparatus 102 and is actively utilizing a network connection to the network 106 or other network provided by the communication apparatus 102. As a further example, the adaptive notification circuitry 418 may determine that a watch or other device worn on a user's person is connected to the communication apparatus 102 and is capable of generating an alert detectable by the user.

In some example embodiments, the adaptive notification circuitry 418 may be configured to determine usage of a connected apparatus 110 based on a usage status indication received from the connected apparatus 110. In this regard, a connected apparatus 110 (e.g., the interpretive notification circuitry 518) may be configured to communicate a usage status indicating a status of the connected apparatus 110 to the communication apparatus 102. The usage status may indicate whether the connected apparatus 110 is reserved or otherwise being used. Additionally or alternatively, the usage status may provide details of how a connected apparatus 110 is being used. By way of example and not by way of limitation, examples of details of how a connected apparatus 110 is being used that may be indicated in a usage status may include an indication of what activity the connected apparatus 110 is engaged in, whether the connected apparatus 110 has any unused user interface capabilities, such as may be used for notifying a user of an event, and/or the like. A usage status may be sent by a connected apparatus 110 at the discretion of the connected apparatus 110, such as when a usage status of the connected apparatus 110 has changed. Additionally or alternatively, the connected apparatus 110 may send a usage status in response to a usage status query to the connected apparatus 110 by the adaptive notification circuitry 418.

The adaptive notification circuitry 418 may be configured to determine usage of a connected apparatus 110 in response to detection of an event. Additionally or alternatively, the adaptive notification circuitry 418 may be configured to determine usage of a connected apparatus 110 in response to detection of a new connection between a connected apparatus 110 and the communication apparatus 102, detection of data transfer (for example, use of a headset for receipt of audio streamed by the communication apparatus 102) between the communication apparatus 102 and a connected apparatus 110, and/or the like. As another example, the adaptive notification circuitry 418 may be configured to determine usage of a connected apparatus 110 periodically, such as by periodically polling for any connected apparatuses 110.

The adaptive notification circuitry 418 may additionally be configured to determine, based on the determined usage, a notification method for notifying a user of a detected event. In this regard, the adaptive notification circuitry 418 may take into account the available connected apparatus(es) 110, the capabilities of connected apparatus(es) 110, any active usage of a connected apparatus 110, and/or the like.

The adaptive notification circuitry 418 may, for example, be configured to determine a notification method enabling notification of a detected event without interfering with usage of a connected apparatus 110. In this regard, the adaptive notification circuitry 418 may be configured to determine a notification method that may enable a user to be alerted of an event in a way that may not negatively impact the user's usage of a connected apparatus 110. For example, if a user is listening to audio that is unrelated to a detected event and that is being streamed by the communication apparatus 102 to a connected headset, it may be undesirable for an audible alert for a detected event to be conveyed to the user by the headset because the alert may negatively impact the user's ongoing audio stream. However, the user may not be able to hear an audible alert generated by the communication apparatus 102 or another connected apparatus 110 over the audio being streamed to the headset. Accordingly, if a second connected apparatus 110 is capable of providing a mechanical (e.g., vibrating) alert and/or a visual alert, the adaptive notification circuitry 418 may be configured to determine to notify of a detected event by triggering the second connected apparatus 110 to provide a mechanical and/or visual alert indicative of the event. In this regard, it will be appreciated that the adaptive notification circuitry 418 may be configured to adaptively modify how a detected event is alerted to a user based on the determined usage.

In determining a notification method, the adaptive notification circuitry 418 may be configured to determine exactly how a selected connected apparatus 110 (or multiple connected apparatuses 110) should notify a user of a detected event. Alternatively, the adaptive notification circuitry 418 may instead select a connected apparatus 110 (or multiple connected apparatuses 110) to have notify a user of the detected event such that the selected connected apparatus 110 may be triggered to notify the user in a manner determined by the selected connected apparatus 110.

It will be appreciated that in embodiments wherein the adaptive notification circuitry 418 determines how a connected apparatus 110 should notify a user, the adaptive notification circuitry 418 may define any number of parameters that may specify how a user interface of a connected apparatus 110 should notify the user. For example, in determining a notification method, the adaptive notification circuitry 418 may be configured to determine a mode of alert (e.g., audible, mechanical, vibrating, visual, some combination thereof, or the like) to notify a user of the event. The adaptive notification circuitry 418 may additionally or alternatively determine various parameters of an alert. For example, the adaptive notification circuitry 418 may determine a length of an alert, an intensity of an alert, and/or the like. The adaptive notification circuitry 418 may accordingly select at least one connected apparatus 110 from among one or more connected apparatuses 110 connected to the communication apparatus 102 to instruct to provide an alert notifying a user of the detected event in accordance with a determined notification method.

The adaptive notification circuitry 418 may be configured to determine a notification method based at least in part on the type of detected event. In this regard, for example, the adaptive notification circuitry 418 may be configured to select a connected apparatus 110 for notifying of an event and/or determine how a selected connected apparatus 110 should notify a user of a detected event based on the type of the detected event. As an example, the adaptive notification circuitry 418 may be configured to determine a notification method for a detected communication event that is different from a notification method for a detected browsing event, low battery condition, calendar event, or the like. As another example, the adaptive notification circuitry 418 may be configured to determine a notification method for a detected received email that is different from a notification method that may be determined for a detected incoming phone call or other type of communication event.

In addition to determining a notification method, the adaptive notification circuitry 418 may further be configured to modify the user interface 416 based on the determined usage. For example, if the adaptive notification circuitry 418 determines that audio is being streamed to a connected headset, the adaptive notification circuitry 418 may disable a ringer, speaker, and/or other audible user interface portion used for providing audible alerts.

The adaptive notification circuitry 418 may be further configured to generate an event notification message based on a determined notification method. The event notification message may comprise a dedicated message or may comprise an extension, parameter, or other portion inserted in another message. The event notification message may be formatted in accordance with any protocol used for communication between the communication apparatus 102 and a connected apparatus 110. In this regard, the event notification message may be formatted in accordance with any protocol supported by the local network 108, communication link 122, and/or the like.

The event notification message may comprise one or more parameters selected based on the determined notification method so as to trigger a connected apparatus 110 receiving the event notification message to provide an alert indicative of a detected event in accordance with the determined notification method. Accordingly, the parameters may, for example indicate one or more of a mode of alert (e.g., audible, mechanical, vibrate, visual, some combination thereof, or the like), a length of alert, an intensity of alert, whether an audible alert is to be provided, length of an audible alert, volume of an audible alert, whether a vibrating alert is to be provided, intensity of a vibrating alert, length of a vibrating alert, luminance of a visual alert, length of a visual alert, or the like.

In one example, the event notification message may comprise a parameter indicating a ringer and/or audible alert status of the communication apparatus 102. For example, if a ringer of the communication apparatus 102 is deactivated, this may be indicated in a parameter of an event notification message. The parameter indicating ringer status may, for example, comprise a ringer status indicator provided by the Personal User Interface Device Bluetooth profile. The indication of a ringer status of the communication apparatus 102 may trigger a connected apparatus 110 to behave in correspondence with the communication apparatus 102. Thus, if a connected apparatus 110 receives an event notification message indicating that a ringer of the communication apparatus 102 is deactivated, the connected apparatus 110 may provide an alert indicative of an event by non-audible means, such as by vibrating, providing a visual alert, and/or the like.

Alternatively, in embodiments wherein in determining a notification method, the adaptive notification circuitry 418 selects a connected apparatus 110 without determining further parameters of how the selected connected apparatus 110 is to notify a user, the event notification message may not include any particular parameters defining how the notification should be provided.

The event notification message may, for example, include a parameter indicating a type of the detected event (e.g., communication event, type of communication event, browsing event, low battery condition, or the like) that the selected connected apparatus 110 is to notify a user of. In this regard, the interpretive notification circuitry 518 may be configured to determine how to notify of a detected event based on the indicated type of the event.

The adaptive notification circuitry 418 may be additionally configured to cause a generated event notification message to be sent to one or more connected apparatuses 110 (e.g., to one or more selected connected apparatuses 110) to trigger the recipient connected apparatus(es) 110 to provide an alert indicative of a detected event in accordance with the determined notification method. In embodiments wherein the adaptive notification circuitry 418 selects a connected apparatus 110 to provide an alert from among the connected apparatuses 110 that are connected to the communication apparatus 102, the adaptive notification circuitry 418 may be configured to cause the event notification message to be sent specifically to the selected connected apparatus 110.

The interpretive notification circuitry 518 of a connected apparatus 110 may accordingly be configured to receive an event notification message sent by the communication apparatus 102. The interpretive notification circuitry 518 may be further configured to parse a received event notification message to extract any parameters indicative of a notification method from the received message.

In embodiments wherein a received event notification message includes parameters defining a mode and/or other characteristics of a notification, the interpretive notification circuitry 518 may additionally be configured to cause a connected apparatus 110 to provide an alert indicative of an event in accordance with a notification method indicated by the extracted parameter(s). Thus, if the extracted parameter(s) indicate a mode of alert, length of an alert, intensity of an alert, and/or the like, the interpretive notification circuitry 518 may be configured to act accordingly. If an extracted parameter indicates a ringer status of the connected apparatus 110, the interpretive notification circuitry 518 may, for example, be configured to provide an alert corresponding to the ringer status. Thus, if the ringer status indicates that a ringer of the connected apparatus 110 is deactivated, the interpretive notification circuitry 518 may cause the connected apparatus 110 to provide a non-audible alert.

In some embodiments, such as in embodiments wherein a received event notification message does not include parameters defining how an alert should be provided or includes a limited set of parameters that only partially define how an alert should be provided, the interpretive notification circuitry 518 may be configured to determine a mode of alert. In this regard, the interpretive notification circuitry 518 may determine how to provide an alert and/or characteristics of an alert. Such characteristics may include any characteristic discussed above as potentially being defined by way of a parameter (e.g., vibrating alert, visual alert, audible alert, length of alert, intensity of an alert, and/or the like). For example, the interpretive notification circuitry 518 may determine a vibration pattern for an alert, how many times to flash a visual indication of an alert, and/or other characteristics and/or mode(s) of an alert. Accordingly, the interpretive notification circuitry 518 may be configured to make a final determination of how to provide an alert in instances wherein alert parameters are not fully predetermined and defined by the adaptive notification circuitry 418 in an event notification message.

In embodiments wherein the event notification message indicates a type of the detected event for which an alert is to be provided, the interpretive notification circuitry 518 may be configured to determine a mode of alert based at least in part on the indicated type. In this regard, the interpretive notification circuitry 518 may be configured to determine a mode of alert for a first type of event that is different from a mode of alert that the interpretive notification circuitry 518 may determine for a second type of event.

The interpretive notification circuitry 518 may, for example, be configured to cause an alert to be provided by the user interface circuitry 516. Accordingly, the type of alert provided may depend on the available output means of the user interface 516 as well as on the notification method indicated in a received event notification message.

In some embodiments, the interpretive notification circuitry 518 may be configured to acknowledge a received event notification message. In this regard, the interpretive notification circuitry 518 may be configured to send an acknowledgement to the communication apparatus 102. Such acknowledgement may be sent in response to receipt of the event notification message, in response to providing an alert so as to confirm provision of the alert, and/or in response to a user acknowledgement of a provided alert so as to acknowledge that the user has received and acknowledged the alert. Accordingly, in such embodiments, the adaptive notification circuitry 418 may be enabled to confirm that the event notification message has been received and/or that the user has been provided with an alert. In the absence of receipt of an acknowledgement message, the adaptive notification circuitry 418 may be configured to resend an event notification message and/or may send an event notification message to another connected apparatus as a failsafe mechanism. For example, the adaptive notification circuitry 418 may resend an event notification message and/or send an event notification message to another connected apparatus if an acknowledgement of a previously sent event notification message has not been received by expiration of a predefined timeout period.

Further, in embodiments wherein a user may acknowledge an alert, if the user does not acknowledge an alert, such as within a predefined time period, a different alert may be provided to the user. In this regard, for example, the interpretive notification circuitry 418 may be configured to provide a more intense (e.g., louder audible alert, more intense vibration alert) alert, a different mode of alert, and/or the like if a user does not acknowledge a previous alert. Additionally or alternatively, if a user does not acknowledge an alert, the interpretive notification circuitry 418 may be configured to send a message to another connected apparatus 110 to trigger the another connected apparatus 110 to provide an alert to the user.

Having described the configurations of various example embodiments, several example scenarios utilizing example embodiments will now be described. In a first example scenario, the communication apparatus 102 may be connected to a headset and a wrist watch. The communication apparatus 102 may be streaming music to the headset and receive an incoming phone call. The adaptive notification circuitry 418 may accordingly determine to trigger the wrist watch to provide a non-audible alert (e.g., a visual alert and/or a vibrating alert). In this regard, a user may be notified of the incoming call without interfering with the audio streamed over the headset and in a manner that the user may be able to detect even while the user is engaged in listening to music with the headset. The adaptive notification circuitry 418 may additionally or alternatively determine to trigger the connected headset to issue an intermittent "beep" or other relatively non-obtrusive audible indication via the headset over the music. In this regard, the user may be provided with an audible alert without impacting enjoyment of the streaming music to a great extent.

In one extension of the first example scenario, the interpretive notification circuitry 518 of the watch may be configured to determine whether the watch is being worn by a user. If the interpretive notification circuitry 518 determines that the watch is not being worn, the interpretive notification circuitry 518 may determine not to provide a vibrating alert even if instructed to in the received event notification message. In this scenario, the interpretive notification circuitry 518 of the watch may instead provide an audio/visual alert. Additionally or alternatively, the interpretive notification circuitry 518 of the watch may notify the host apparatus 102 of a notification exception indicating that an alert may not be provided and/or was not effective such that another notification method may be determined by the adaptive notification circuitry 418.

In a second example scenario, the communication apparatus 102 may be tethered to a tablet computer, mobile computer, or the like, which is utilizing a network connection provided by the communication apparatus 102. The adaptive notification circuitry 418 may accordingly be configured to determine that the tethered computing device is actively exchanging data via a network connection provided by the communication apparatus 102 and divert the incoming phone call to the tethered device. If a watch, headset, and/or other connected apparatus 110 is connected to the communication apparatus 102 in addition to the tethered device, the adaptive notification circuitry 418 may trigger one or more of the additional connected apparatuses 110 to provide an alert indicative of the incoming phone call.

In a third example scenario, the communication apparatus 102 may be connected to a second computing device, such as a mini personal computer (mini PC). A headset may be connected to the second computing device. The adaptive notification circuitry 418 may be configured to detect that the communication apparatus 102 is connected to the second computing device. Depending on the configuration, the adaptive notification circuitry 418 may be further configured to detect that the headset is connected to the second computing device. The adaptive notification circuitry 418 may be configured to trigger the second computing device to provide an alert indicative of an incoming call. As another example, the adaptive notification circuitry 418 may determine to route an incoming call to the headset. In this regard, the adaptive notification circuitry 418 may route the call directly to the headset or may route the call indirectly via the second computing device. If routing the call directly, the adaptive notification circuitry 418 may cause the communication apparatus 402 to connect to the headset for purposes of routing the call. If the adaptive notification circuitry 418 needs usage information, identification information, and/or other information to facilitate directly routing the call to the headset, the adaptive notification circuitry 418 may be configured to determine this information from the second computing device.

Figure 6:
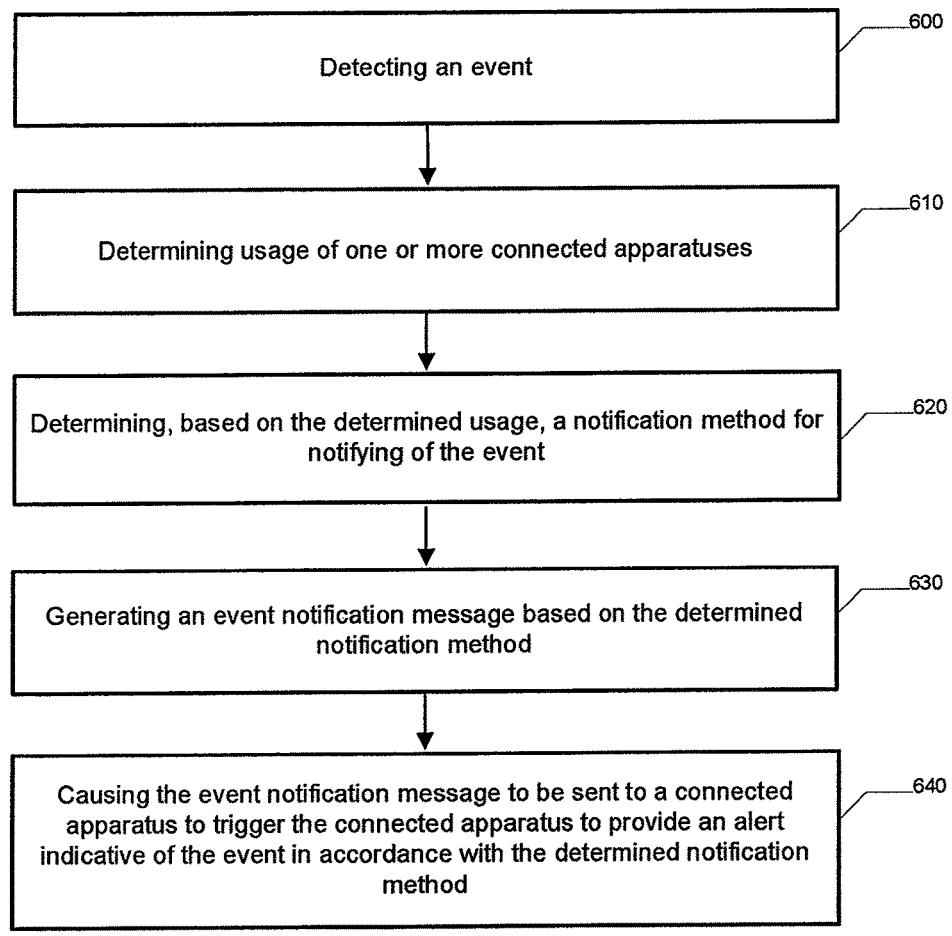
FIG. 6 illustrates a flowchart according to an example method for providing adaptive user notifications according to an example embodiment of the invention.

FIG. 6 illustrates a flowchart according to an example method for providing adaptive user notifications according to an example embodiment of the invention. In this regard, FIG. 6 illustrates operations that may, for example, be performed at the communication apparatus 102. The operations illustrated in and described with respect to FIG. 6 may, for example, be performed by, under control of, and/or with the assistance of one or more of the processor 410, memory 412, communication interface 414, user interface 416, or adaptive notification circuitry 418. Operation 600 may comprise detecting an event. Operation 610 may comprise determining usage of one or more connected apparatuses. It will be appreciated, however, that the ordering of operations 600 and 610 is not limited to operation 610 occurring subsequent to operation 600. Operation 620 may comprise determining, based on the determined usage, a notification method for notifying of the event. Operation 630 may comprise generating an event notification message based on the determined notification method. Operation 640 may comprise causing the event notification message to be sent to a connected apparatus to trigger the connected apparatus to provide an alert indicative of the event in accordance with the determined notification method.

Figure 7:
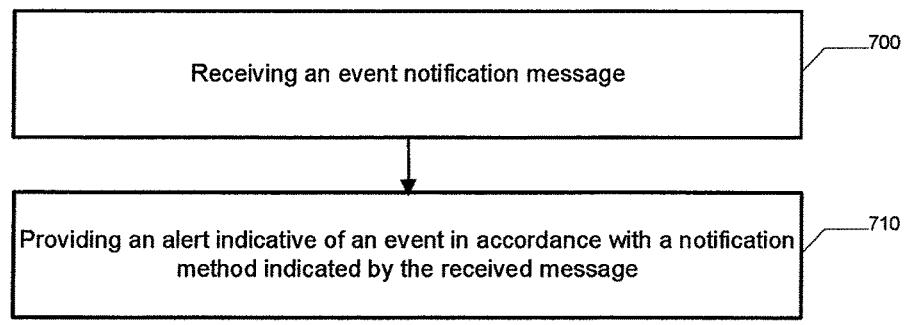
FIG. 7 illustrates a flowchart according to an example method for providing adaptive user notifications according to an example embodiment of the invention.

FIG. 7 illustrates a flowchart according to an example method for providing adaptive user notifications according to an example embodiment of the invention. In this regard, FIG. 7 illustrates operations that may, for example, be performed at a connected apparatus 110. The operations illustrated in and described with respect to FIG. 7 may, for example, be performed by, under control of, and/or with the assistance of one or more of the processor 510, memory 512, communication interface 514, user interface 516, or interpretive notification circuitry 518. Operation 700 may comprise receiving an event notification message. Operation 710 may comprise providing an alert indicative of an event in accordance with a notification method indicated by the received message.

FIGS. 6-7 are flowcharts of a system, method, and computer program product according to example embodiments of the invention. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device and executed by a processor in the computing device. In some embodiments, the computer program instructions comprising the computer program product(s) which embody the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more computer-readable memories (for example, memory 412 and/or memory 512) on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus (for example, the communication apparatus 102 and/or a connected apparatus 110) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product(s).

The above described functions may be carried out in many ways. For example, any suitable means for carrying out each of the functions described above may be employed to carry out embodiments of the invention. In one embodiment, a suitably configured processor (for example, the processor 410 and/or processor 510) may provide all or a portion of the elements. In another embodiment, all or a portion of the elements may be configured by and operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method comprising:
   detecting an event;
   determining usage of one or more of a plurality of connected apparatuses, the usage representative of one or more activities in which the plurality of connected apparatuses are engaged;
   selecting, by adaptive notification circuitry, at least one of the plurality of connected apparatuses based at least in part on the usage, wherein selecting at least one of the plurality of connected apparatuses comprises selecting the at least one of the plurality of connected apparatuses so as to avoid interfering with usage of an in-use connected apparatus;
   generating an event notification message; and
   causing the event notification message to be sent to the selected at least one of the plurality of connected apparatuses to provide an alert indicative of the event.

2. The method of claim 1, further comprising determining a type of the event, and selecting the at least one of the plurality of connected apparatuses based at least in part on the type of the event.

3. The method of claim 1, wherein the event comprises a communication event.

4. he method of claim 1, further comprising:
   selecting a notification method for the event notification message; and
   causing the selected at least one of the plurality of connected apparatuses to send the event notification message according to the notification method.

5. The method of claim 4, further comprising determining which apparatuses are connected to a communication apparatus, and determining the notification method based at least in part on which apparatuses are connected to the communication apparatus.

6. The method of claim 4, wherein the at least one of the plurality of connected apparatuses is selected based at least in part on the selected notification method.

7. The method of claim 1, wherein determining usage of the one or more connected apparatuses comprises:
   determining one or more user interface capabilities for each of the one or more connected apparatuses; and
   determining that at least one of the one or more user interface capabilities is in use.

8. The method of claim 1, wherein detecting an event comprises detecting a communication received by a mobile phone, and wherein a connected apparatus comprises an apparatus connected to the mobile phone by one of a personal area network, direct physical connection, or a dedicated wireless connection.

9. An apparatus comprising at least one processor and at least one memory storing computer program code, the at least one memory and stored computer program code are configured, with the at least one processor, to cause the apparatus to at least:
   detect an event;
   determine usage of one or more connected apparatuses, the usage representative of one or more activities in which the one or more connected apparatuses are engaged;
   select, by adaptive notification circuitry, at least one of a plurality of connected apparatuses based at least in part on the usage, the plurality of connected apparatuses comprising the one or more connected apparatuses, wherein the at least one memory and stored computer program code are configured, with the at least one processor, to cause the apparatus to select the at least one of the plurality of connected apparatuses by selecting the at least one of the plurality of connected apparatuses so as to avoid interfering with usage of an in-use connected apparatus;
   generate an event notification message; and
   cause the event notification message to be sent to the selected at least one of the plurality of connected apparatuses to provide an alert indicative of the event.

10. The apparatus of claim 9, wherein the at least one memory and stored computer program code are configured, with the at least one processor, to cause the apparatus to determine a type of the event, and wherein the at least one of the plurality of connected apparatuses is selected based at least in part on the type of the event.

11. The apparatus of claim 9, wherein the event comprises a communication event.

12. The apparatus of claim 9, wherein the at least one memory and stored computer program code are configured, with the at least one processor, to cause the apparatus to:
   select a notification method for the event notification message; and
   cause the selected at least one of the plurality of connected apparatuses to send the event notification message according to the notification method.

13. The apparatus of claim 12, wherein the at least one memory and stored computer program code are configured, with the at least one processor, to cause the apparatus to determine the notification method based at least in part on which apparatuses are connected to a communication apparatus.

14. The apparatus of claim 12, wherein the at least one of the plurality of connected apparatuses is selected based at least in part on the selected notification method.

15. The apparatus of claim 12, wherein the at least one memory and stored computer program code are configured, with the at least one processor, to cause the apparatus to:
   determine usage of the one or more connected apparatuses by at least determining that a first connected apparatus is being used for streaming audio unrelated to the event and determining availability of a second connected apparatus configured for providing an alert;
   determine a notification method by determining to trigger provision of a non-audible alert by the second connected apparatus; and
   cause the event notification message to be sent by causing the event notification message to be sent to the second connected apparatus to trigger the second connected apparatus to provide a non-audible alert indicative of the event.

16. The apparatus of claim 9, wherein detecting an event comprises detecting a communication received by a mobile phone, and wherein a connected apparatus comprises an apparatus connected to the mobile phone by one of a personal area network, direct physical connection, or a dedicated wireless connection.

17. The apparatus of claim 9, wherein the apparatus is a mobile phone.

18. A computer program product comprising at least one non-transitory computer-readable storage medium having computer-readable program instructions stored therein, wherein when the computer-readable program instructions are executed by an apparatus, the computer-readable program instructions configure the apparatus to perform a method comprising:
   detecting an event;
   determining usage of one or more connected apparatuses, the usage representative of one or more activities in which the one or more connected apparatuses are engaged;
   selecting, by adaptive notification circuitry, at least one of a plurality of connected apparatuses based at least in part on the usage, the plurality of connected apparatuses comprising the one or more connected apparatuses, wherein the computer-readable program instructions configure the apparatus to perform the method further comprising selecting the at least one of the plurality of connected apparatuses by selecting the at least one of the plurality of connected apparatuses so as to avoid interfering with usage of an in-use connected apparatus;
   generating an event notification message; and
   causing the event notification message to be sent to the selected at least one of the plurality of connected apparatuses to provide an alert indicative of the event.

* * * * *

UNITED STATES PATENT AND TRADEMARK OFFICE
CERTIFICATE OF CORRECTION

PATENT NO. : 9,819,537 B2
APPLICATION NO. : 14/829069
DATED : November 14, 2017
INVENTOR(S) : Palin et al.

It is certified that error appears in the above-identified patent and that said Letters Patent is hereby corrected as shown below:

In the Claims

Column 21,
Line 60, "he method" should read --The method--.

Signed and Sealed this
Nineteenth Day of June, 2018

Andrei Iancu
*Director of the United States Patent and Trademark Office*